United States Patent

[11] 3,588,546

| [72] | Inventor | Klaus Lagemann<br>Garstedt, Germany |
|------|----------|----|
| [21] | Appl. No. | 686,144 |
| [22] | Filed | Nov. 28, 1967 |
| [45] | Patented | June 28, 1971 |
| [73] | Assignee | U. S. Philips Corporation<br>New York, N.Y. |
| [32] | Priority | Nov. 29, 1966 |
| [33] | | Germany |
| [31] | | P40894 |

[54] BISTABLE TRIGGER CIRCUIT HAVING DIFFERENT VOLTAGE THRESHOLD
6 Claims, 17 Drawing Figs.

[52] U.S. Cl.................................................... 307/291,
307/208, 307/215, 328/92
[51] Int. Cl........................................................ H03k 3/26,
H03k 19/34
[50] Field of Search.......................................... 307/203,
206, 208, 215, 291, 209, 207, 214; 328/92

[56] References Cited
UNITED STATES PATENTS

| 3,234,401 | 2/1966 | Dinman.......................... | 307/215X |
| 3,284,645 | 11/1966 | Eichelberger................ | 307/215 |
| 3,218,483 | 11/1965 | Clapper........................ | 307/203X |
| 3,446,989 | 5/1969 | Allen et al. ................... | 307/208 |

Primary Examiner—Stanley D. Miller, Jr.
Attorney—Frank R. Trifari

ABSTRACT: A bistable trigger circuit for preventing spurious signals from affecting the output during the rise and fall time of an input clock signal utilizing a logic stage intermediate the input and output stages. The intermediate stage is provided with a thresholded element for response earlier in time than the remaining logic elements during the rise time, and later in time during the fall time. Logic elements coupled to the thresholded element thus are blocked to the passage of a spurious pulse.

INVENTOR.
KLAUS LAGEMANN
BY
Frank R. Trifari
AGENT

BISTABLE TRIGGER CIRCUIT HAVING DIFFERENT VOLTAGE THRESHOLD

The invention relates to a bistable trigger circuit comprising logical elements having different voltage thresholds and including signal inputs and one clock pulse input.

Generally, bistable trigger circuits suitable for counting purposes comprise, in addition to preset inputs and signal inputs, a clock pulse input. This clock pulse input is normally controlled by a clock pulse source. Usually the edge steepness of the clock pulses is required to exceed a given minimum value and is obtained both for capacitive coupling of the clock pulses, which has predominantly been used hitherto in conventional circuits, and for resistive coupling, which is predominantly used in integrated circuits.

Frequently the requirement of a minimum edge steepness of the clock pulses is inconvenient. In principle this requirement may be avoided by resistivity applying the clock pulses while providing special voltage thresholds in the bistable trigger circuit. Especially in integrated circuits this permits the use of pulses having arbitrarily low-gradient edges, i.e. pulses having arbitrarily gradually sloping edges.

Bistable trigger circuits employing such thresholds are known. However, these trigger circuits all have the following special property: in designing comparatively large circuit arrangements built up from such bistable trigger circuits attention must be paid to the instants at which the leading and trailing edges of a clock pulse occur. Owing to this property these trigger circuits differ greatly from the trigger circuits in which the clock pulses are capacitively applied. In the latter circuits attention must be paid only to the instant of the leading or the trailing edge. This property greatly facilitates designing such arrangements.

It is an object of the present invention to combine the possibility of arbitrarily low-gradient clock pulse edges, i.e. a property deriving from direct-current technology, with the property deriving from alternating-current technology (capacitive coupling) according to which the instants at which the edges occur have to satisfy certain requirements, the resulting bistable trigger circuit combining certain advantages of DC circuits with certain advantages of AC circuits.

According to the invention, this problem is solved by providing only logic elements, the clock pulse input acting upon such elements which by cross-coupling or feedback are connected to one another so as to form a switching network which behaves as a store. The various voltage thresholds are arranged so that sharp unwanted pulses which may be produced at some logic elements of the network during the nontriggering clock pulse edge do not influence the logic output element of the trigger circuit, and thereby produce a reaction due to the application of the clock pulses to logic elements of this switching network and to the resulting indirect cutoff effect of the decayed clock pulse, which reaction through the output of the trigger stage acts on the signal input, is prevented.

The differences in operation between the trigger circuits in accordance with the invention and the known trigger circuits will now be described in greater detail, with reference to the accompanying drawing wherein FIG. 1 shows a basic trigger circuit, FIG. 2 the relative waveform, FIG. 3 a further form of trigger circuit, FIG. 5 the applicable waveforms, FIG. 4 a JK flip-flop, FIG. 6, 7 and 8 and waveforms of operation of the arrangement of FIG. 4, FIG. 9 a D type flip-flop, FIGS. 10, 11 and 12 the waveforms of operation of FIG. 9, and FIGS. 13, two NOR elements, FIG. 14 the waveforms of FIG. 13 operation, FIG. 15 an embodiment of FIG. 9, and FIGS. 16 and 17 the waveforms applicable to FIG. 15.

Figure 1:
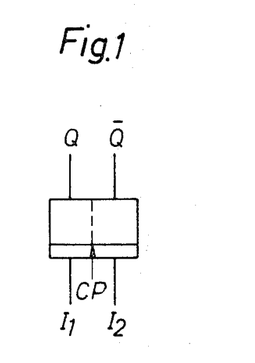

FIG. 1 shows a symbol for a trigger circuit having signal inputs $I_1$ and $I_2$ and a clock pulse input CP. The arrow at the clock pulse input indicates that the clock pulses are to be considered to be capacitively applied. For a better understanding the clock pulse cycle $t_o$ is subdivided in several sections (see FIG. 2).

Figure 2:
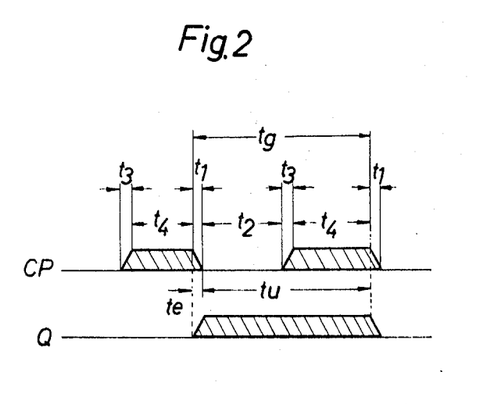

$t_1 \triangleq$ decaying clock pulse edge,
$t_2 \triangleq$ rest condition at the pulse level 0,
$t_3 \triangleq$ rising clock pulse edge,
$t_4 \triangleq$ rest condition at the clock pulse level 1.

The decaying edge $t_1$ causes the change over of the outputs Q and $\overline{Q}$ of the trigger circuit. During this time $t_1$ no signal variation is permitted at the signal inputs $I_1$ and $I_2$, since otherwise the reliability of the trigger circuits is adversely affected. During the time $t_1$ the trigger circuit effectively in "sensitive" to signal variations at the inputs $I_1$ and $I_2$. Indicating the concept "sensitive" symbolically by the index $e$, we have:

$$t_e = t_1.$$

During the remaining periods $t_2$, $t_3$ and $t_4$ the signals at the signal inputs $I_1$ and $I_2$ may be changed without the condition of the outputs Q and $\overline{Q}$ being affected. Thus a period can be defined in which the trigger circuit is "insensitive" to variations at the signal inputs. Referring to this period as $t_u$ we have:

$$t_u = t_2 + t_3 + t_4.$$

The reactions of the trigger stage are determined solely by the periods $t_e$ and $t_u$. In practice this means that it is immaterial whether necessary signal variations at the signal inputs $I_1$ and $I_2$ take place during the period $t_2$ or $t_3$ or $t_4$. Hence, in designing circuit arrangements including such trigger circuits there is no compulsory time sequence of the signal variations at the inputs $I_1$ and $I_2$ and of the rising clock pulse edge. This greatly simplifies the design of asynchronous circuit arrangements comprising such trigger circuits.

Since, as has been mentioned hereinbefore, the clock pulses are applied capacitively, the clock pulse edge, i.e. the decaying edge, must have at least a given steepness. With regard to the capacitive coupling of the clock pulses particularly as used in conventional circuits it can briefly be said:

ADVANTAGE

Only the decaying edge of the clock pulse is functionally significant, in other words, during the remaining time $t_u = t_2 + t_3 + t_4$ there is no compulsory time sequence of signal variations.

DISADVANTAGE

The decaying clock pulse must at least have a given steepness.

Figure 3:
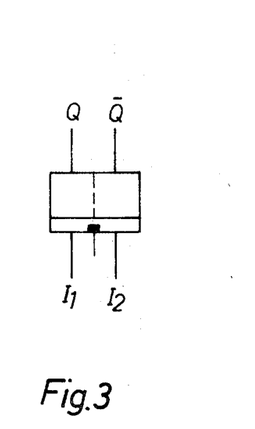
Figure 4:
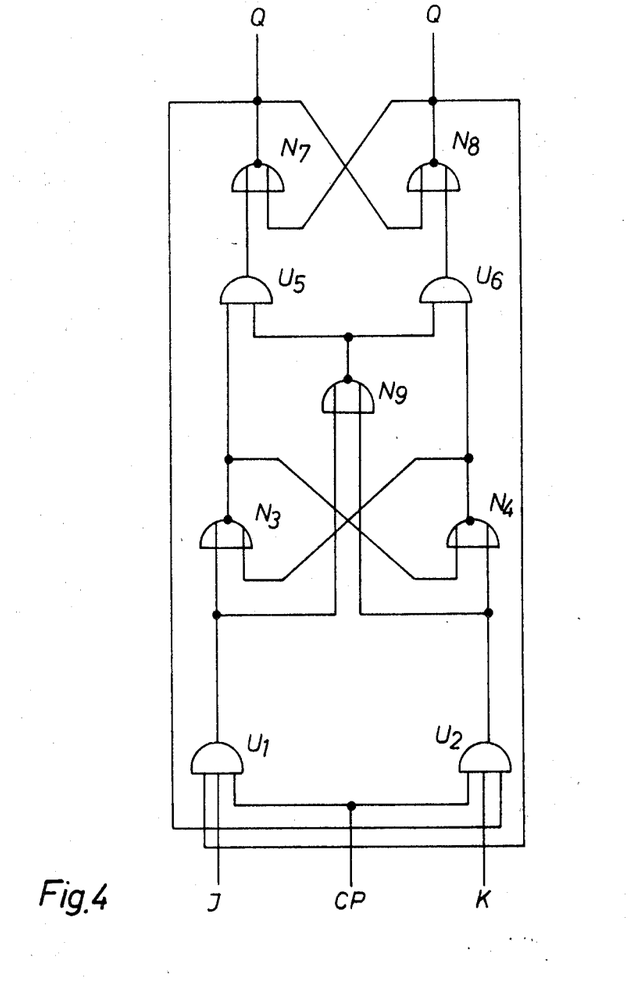

In integrated circuits, resistive coupling of the clock pulses is preferred. As a symbol the circuit of FIG. 3 has been chosen. Unlike the symbol for capacitive coupling (FIG. 1), in FIG. 3 the clock pulse CP is characterized by a small filled rectangle. The internal structure of trigger circuits using resistive coupling of the clock pulses may be represented by the combination of logic elements. FIG. 4 shows by way of example one of the best known devices, known as a JK flip-flop, comprising the NOR element $N_3$, $N_4$, $N_7$, $N_8$ and $N_9$ and the AND elements $U_1$, $U_2$, $U_5$ and $U_6$.

Figure 5:
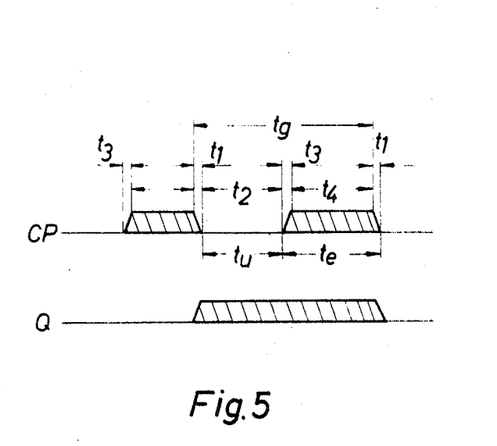

It is assumed that a clock pulse of the shape shown in FIG. 2 is applied to a trigger circuit such as is described and that the edges of the clock pulse are steep so that the period $t_1$ and $t_3$ may be considered to be small compared with the internal transit times of the logic elements. Thus, it will be found that only in the period $t_2$, i.e. in the period following the triggering clock pulse edge $t_1$, signal variations at the signal inputs J and K are permitted without the condition of the outputs Q and $\overline{Q}$ being affected. A variation of the signals at the inputs J and K which takes place during the period $t_3$, $t_4$ and even $t_1$ may cause a reaction of the outputs Q and $\overline{Q}$. According to the above definitions of sensitive and insensitive periods we have: (see FIG. 5)

$$t_e = t_3 + t_4 + t_1.$$

$$t_u \triangleq t_2.$$

If such a trigger circuit is included in asynchronous switching circuits great attention must be paid to the time sequence of the signal variations at the signal inputs J and K and of the rising clock pulse edge. This condition restricts the use of such trigger circuits and hence may be considered a disadvantage.

Although resistive coupling of the clock pulses is used, without taking special steps no arbitrarily low-gradient pulses may be employed. This will be explained more fully with reference to FIGS. 6 and 7.

Figure 6:
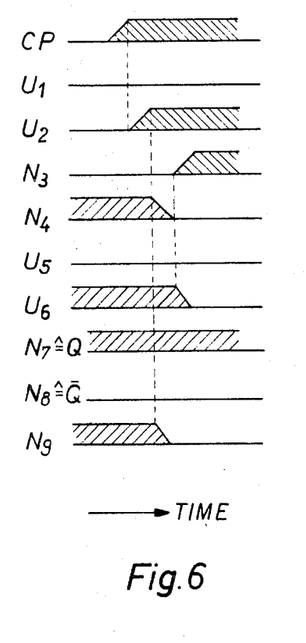

In FIG. 6, the trigger circuit of FIG. 4 is assumed to be in a given condition. In this condition, the outputs of the logic elements $N_4$, $U_6$, $N_7$ and $N_0$ have the logic value 1 and those of the remaining elements the logic value 0. The signal 1 is applied to the inputs J and K. At the clock pulse input CP the change in potential from 0 to 1 takes place which is fast compared with the internal transit times. FIG. 6 shows the manner in which the logic elements successively change over and assume new stable conditions. It should be noted that the outputs of the elements $N_3$ and $N_9$ change in opposite senses. They both influence and AND element $U_5$ (FIG. 4), however, in a manner such that the signal 1 does not simultaneously appear at them owing to differences in transit times.

Figure 7:
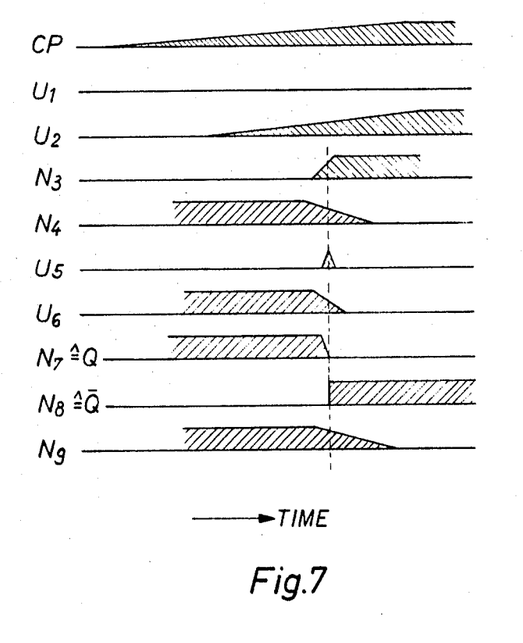

If, as in FIG. 7 a clock pulse edge rising with an arbitrarily low-gradient slope is assumed, there are no longer any transit time effects. Owing to the electric gain which the individual logic elements inherently produce and which may be different in different elements, the rise and/or decay of the signal becomes increasingly steeper, starting from the element $U_2$ and increasing through the elements $N_4$ and $N_9$. Thus, a rising signal is applied to one input of the AND elements and at the same time a decaying signal is applied to the other input. The output of the AND element $U_5$ tends to the value 1 and consequently may initiate an undesirable change in condition of the NOR element $N_7$ and bring the trigger circuit into an absurd operative condition (FIG. 7). It is an advantage of the resistive coupling of the clock pulses that it allows steps which enable clock pulses having arbitrarily low-gradient edges to be used. With respect to the trigger circuit in FIG. 4 it is known to provide artificial differences in the voltage thresholds of the NOR elements $N_4$ (or $N_3$) and $N_9$. The operation will now be described more fully with reference to FIGS. 4 and 8.

Figure 8:
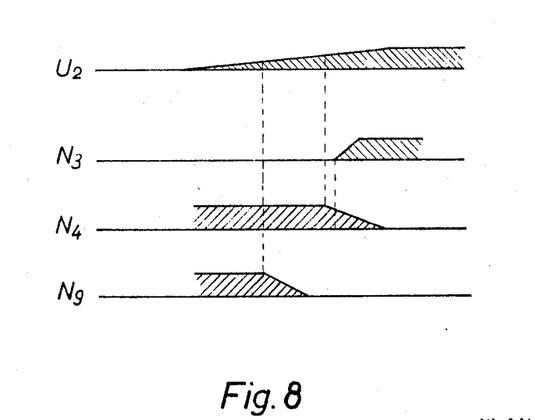

Owing to the slowly rising clock pulse the output value of the AND element $U_2$ also increases. Since this element $U_2$ influences both NOR elements $N_4$ and $N_9$, the output value of these elements tends to the value 0. By using different voltage thresholds, it can be ensured that first the output of the NOR element $N_9$ and only then the output of the NOR element $N_4$ assumes the value 0. At a correspondingly delayed instant the NOR element $N_3$ may tend to the value 1. This prevents with certainty the value 1 from being simultaneously applied to both inputs of the AND element $U_5$.

Summarizing, the trigger circuit shown in FIG. 4 employing various voltage thresholds can be said to have the following properties:

ADVANTAGE: arbitrarily low-gradient clock pulse edges are permitted.

DISADVANTAGE: attention must be paid to the sequence of the signal variation at the signal inputs J and K and of the rising clock pulse edge.

The technical embodiment which enables arbitrarily low-gradient clock pulse edges to be used is based on the fact that by means of different voltage thresholds the unwanted phenomenon which occurs in FIG. 7, element $U_5$, during the slow rise of JK flip-flop pulse can be eliminated.

It should be pointed out that for reasons of symmetry similar unwanted phenomena are also produced at the AND element $U_6$ and can be eliminated in the same manner. That the trigger circuit shown in FIG. 4 is a JK flip-flop and for example, not a D, T, RS, DV or other flip-flop is immaterial to the operation described.

It is an object of the invention to find a trigger circuit which combines the above-mentioned advantage of the use of arbitrarily low-gradient clock pulse edges with the advantage of the arbitrarily sequence of signal variations at the signal inputs and of the rising clock pulse edge. In other words, the advantages of capacitive coupling are to be combined with those of resistive coupling. Since arbitrarily low-gradient edges can only be obtained by resistive coupling, a logic design of trigger circuits must be used which in respect of the ranges "sensitive" and "insensitive" has the typical characteristics shown in FIG. 2, i.e. the characteristics of capacitive clock pulse coupling. The known circuit arrangement shown in FIG. 9, which in this case shows a so-called D flip-flop but which may as well be used with JK, RS, T and DV flip-flops or other flip-flop types, has proved suitable. A typical characteristic of this circuit is that the clock pulse input CP influences two logic elements (in this case $N_3$ and $N_4$) which are both connected in switching networks provided with feedback or cross-coupling and hence having storage properties (in the present case the storage network comprises the NOR elements $N_1$, $N_2$, $N_3$ and $N_4$). In contradistinction thereto, the clock pulse input CP of the trigger circuit of FIG. 5 does not influence logic elements included in switching networks having storage properties.

Figure 9:
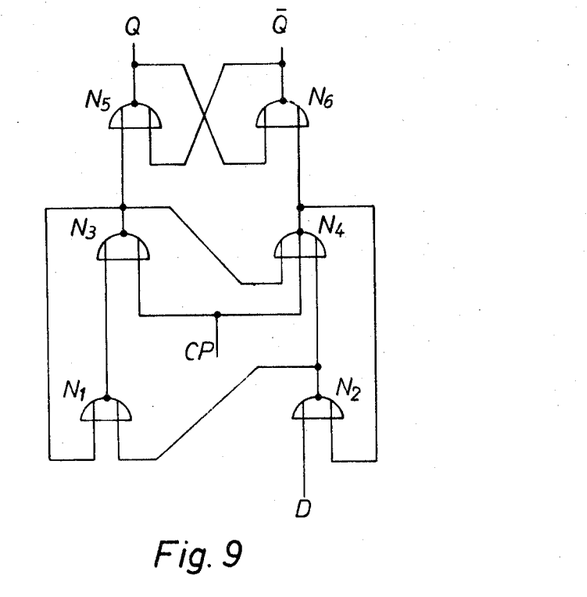

The trigger circuit shown in FIG. 9 cannot be controlled by means of arbitrarily low-gradient clock pulses either. Hitherto no method of obviating this disadvantage has become known.

Figure 10:
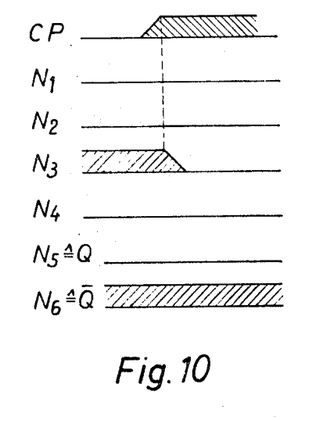
Figure 11:
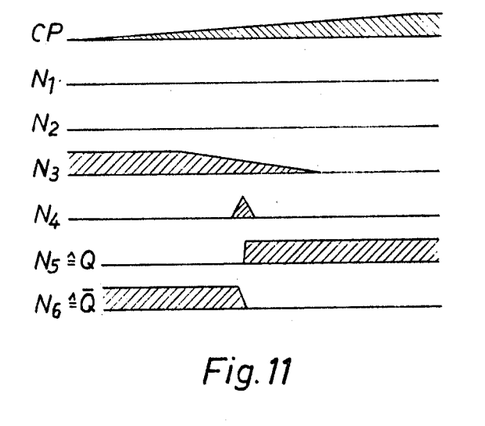

The reason why excessively low-gradient pulse edges give rise to undesirable phenomena will now be explained with reference to FIGS. 10 and 11. FIG. 10 shows the normal case in which it is assumed that the clock pulse edges are sufficiently steep. It is assumed that the signal 1 is applied to the input D. The NOR elements $N_3$ and $N_6$ are in the condition 1 and the remaining NOR elements are in the condition 0. The clock pulse input is changed over from the value 0 to the value 1 at a sufficient speed. In this operation, only the NOR element $N_3$ changes its condition. If, now, as is shown in FIG. 11, a slowly rising edge is applied to the clock pulse input CP, the output of the NOR element $N_3$ tends to the value 0 at the same slow speed. Since the value 0 is applied by the element $N_2$ to the right-hand input of the NOR element $N_4$ (FIG. 9) and mutually opposite signals are applied to the two other inputs, the output of the NOR element $N_4$ temporarily tends to the value 1 and hence initiates an undesirable change in condition of the NOR elements $N_6$ and $N_5$. This effect is similar to the effect described with reference to the trigger circuit of FIG. 4. The trigger circuit of FIG. 9 has the disadvantage that this unwanted effect is produced at a NOR element included in a switching network having storage properties. Consequently, the unwanted sharp pulse at the NOR element $N_4$ (FIG. 11) cannot be eliminated. Any step taken to suppress this unwanted sharp pulse results in that through the feedback path (the NOR elements $N_2$ and $N_1$) an unwanted sharp pulse is produced at the NOR element $N_3$ with even greater certainty.

Figure 12:
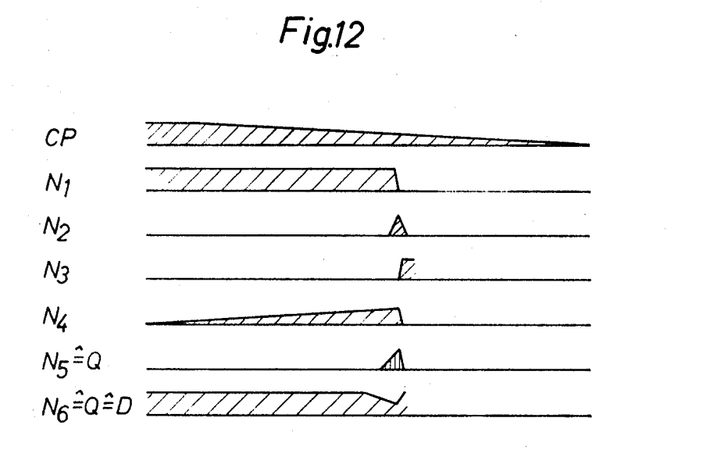

A further undersired effect arises with a low-gradient decaying clock pulse edge (FIG. 12). An initial condition is assumed in which the NOR elements $N_1$ and $N_6$ have the value 1 and the remaining NOR elements the value 0. The output Q (NOR element $N_6$) is connected to the input D, as is often required in practice. With a clock pulse edge decaying at a sufficient speed the trigger circuit is changed over to the opposite condition. With a low-gradient edge, however, the output of the NOR element $N_4$ tending to the signal value 1 may compel the NOR element $N_6$ and hence the input D to assume the value 0 rather than maintaining the output of the NOR element $N_2$ at the value 0. Consequently, an unwanted sharp pulse may be produced at the output of the NOR element $N_2$, which propagates through the NOR elements $N_1$, $N_3$ and $N_5$ and again causes the trigger circuit to change its condition and, possibly, even to oscillate. Such an undesirable phenomenon cannot occur in the trigger circuit shown in FIG. 4, because the decaying clock pulse edge immediately cuts off the input elements $U_1$ and $U_2$. In the trigger circuit shown in FIG. 9, however, the input elements $N_3$ clock pulse $N_4$ are indirectly cut off by the feedback through the NOR elements $N_1$ and $N_2$. (A NOR element is regarded as cut off when the value 1 is applied to at least one of its inputs).

Figure 13:
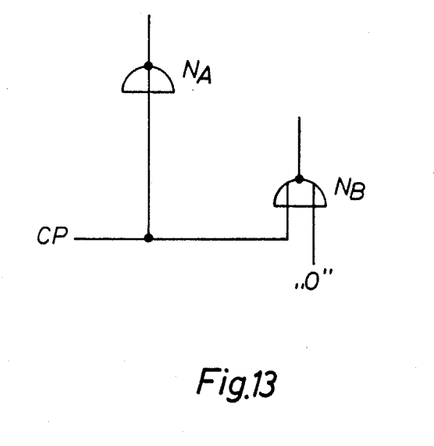
Figure 14:
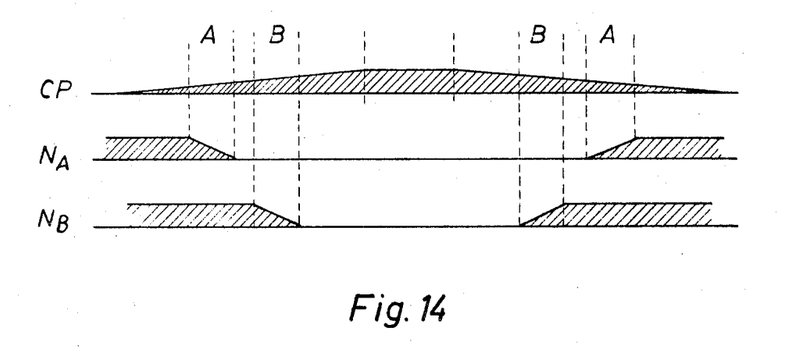

According to the invention, the undesirable effects are neutralized by the provision of different voltage thresholds. FIG. 13 shows two NOR elements $N_A$ and $N_B$ which are assumed to be controlled by a slowly rising and slowly decaying clock pulse applied to the input CP. It is assumed that in accordance with the conditions shown in FIG. 14 both during the rise and during decay two ranges A and B are traversed. It is further assumed that the output of the NOR element $N_A$ always changes condition in the voltage range A and the output of the NOR element $N_B$ in the voltage range B. Such different behavior can be obtained in known manner. For example, U.S. Pat. No. 3,218,483 shows how a plurality of circuits are designed to switch at predetermined threshold levels.

Figure 15:
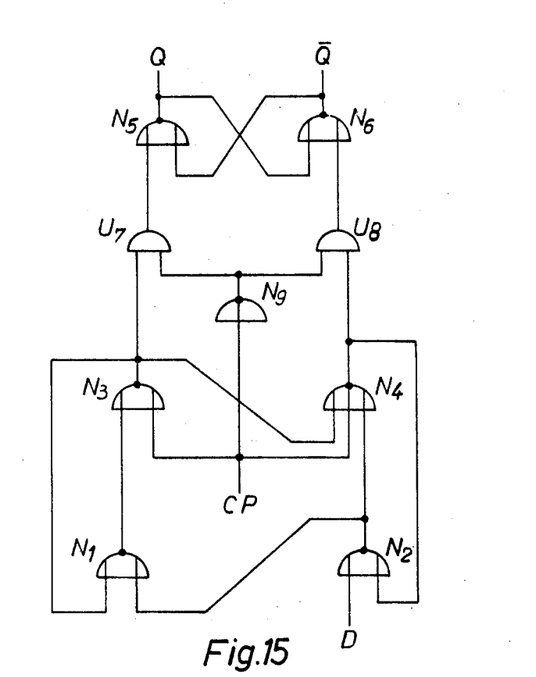

The trigger circuit shown in FIG. 9 is extended in the manner shown in FIG. 15 to include the AND elements $U_7$ and $U_8$ and the NOR element $N_9$. It is assumed that the NOR elements $N_3$ and $N_4$ have voltage threshold similar to that of the NOR element $N_B$ in FIGS. 13 and 14. The NOR element $N_9$ of FIG. 15, however, is given a voltage threshold similar to that of the NOR element $N_A$ of FIGS. 13 and 14.

Figure 16:
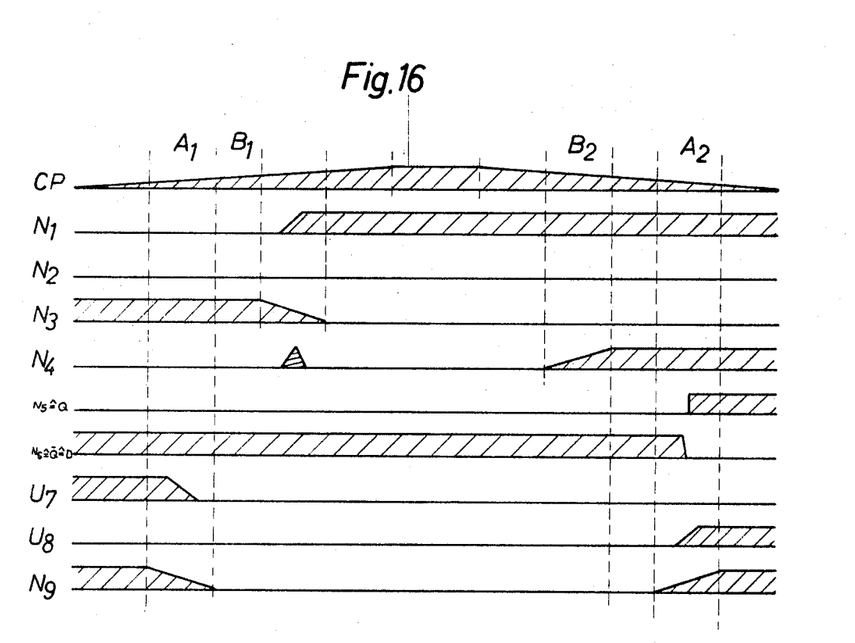

A complete clock pulse cycle will now be described with reference to FIGS. 15 and 16. It is assumed that the input D is connected to the output $\overline{Q}$ (not shown for case of illustration). The elements $N_3$, $N_6$, $U_7$ and $N_9$ have the value 1, the remaining elements the value 0. When the clock pulse edge rises slowly, first the NOR element $N_9$ changes over in the range $A_1$ and as a result cuts off the AND element $U_7$. Only at the end of the range $B_1$ the output of the NOR element $N_3$ begins to tend toward the value 0. As described with reference to FIG. 11, the unwanted sharp pulse is produced at the NOR element $N_4$. However, this pulse cannot adversely affect the NOR element $N_5$ since the AND element $U_7$ provided in accordance with the invention has already been cut off by the NOR element $N_9$.

The second unwanted effect, which is produced during the decaying edge of the clock pulse, is also eliminated by the elements $U_7$, $U_8$ and $N_9$, for the output of the NOR element $N_4$ first changes to the value 1 in the voltage range $B_2$. For the time being, this influences only the NOR element $N_2$ so that the output thereof is maintained at the value 0 with certainty. Only in the voltage range $A_2$ the NOR element $N_9$ prepares the AND element $U_8$ so that the outputs Q and $\overline{Q}$ change condition. The input D now receives the signal 0 but the unwanted sharp pulse shown in FIG. 12 can no longer occur at the NOR element $N_2$ because this element is previously cut off by the output of the element $N_4$.

Figure 17:
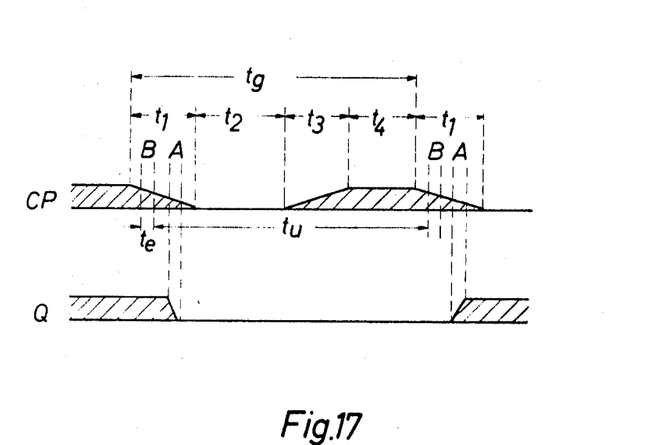

With the aid of the additional elements $U_7$, $U_8$ and $N_9$ a trigger circuit is obtained which can be controlled by clock pulses having arbitrarily low-gradient edges without the necessity of maintaining a predetermined sequence of the signal variations at the signal inputs (in the present case at the input D) and of the rising clock pulse edge. FIG. 17 shows that the period $t_e$ during which the circuit is sensitive to variations at the signal input is reduced to the narrow value defined by the voltage range B. Accordingly, the insensitive period $t_u$ covers the other phases of the clock pulse.

Summarizing, it should be pointed out that in the trigger circuit in accordance with the invention the use of different voltage thresholds is an expedient corresponding to that used in the known trigger circuit shown in FIG. 4. In the latter circuit, however, an unwanted pulse had to be suppressed only during the rising clock pulse edge (FIG. 7, AND element $U_5$). In contradistinction thereto, in the trigger circuit of FIG. 15 the unwanted pulse is not suppressed, but arrested by the AND elements $U_7$ and $U_8$. Furthermore, safety measures must be taken to prevent undesirable oscillation during the decaying clock pulse edge. In principle, other trigger circuits, for example, JK, DV, T and RS flip-flop, may also be given the property in accordance with the invention. For this purpose, one must start from the characteristic feature of coupling the clock pulses through logic elements included in switching networks having storage properties and provide voltage thresholds in accordance with the invention.

The effect produced by the elements $U_7$, $U_8$ and $N_9$ (FIG. 15) may also be achieved by using, for example, and- and/or NOR elements. In a suitable design it may not even be necessary to provide the AND elements $U_7$ and $U_8$ in the form of additional circuit elements. Their logic function may be achieved by resistively connecting the outputs of two transistors or by connecting the transistors in cascade.

Throughout the specification it has been assumed the triggering clock pulse edge was the decaying edge. Obviously, the above discussion also applies when the rising clock pulse edge triggers the circuit. In this event, the conditions shown in the pulse diagrams etc. must simply be complemented.

I claim:

1. A bistable trigger circuit for preventing spurious output signals during the rise and fall times of an input clock pulse, having a signal and clock pulse inputs and comprising an input stage, an output stage and intermediate stage connected between said input and output stages, each of said stages including switchable logic elements having a switching threshold level, said intermediate stage including an additional logic element having a response to a switching operation separated in time from the response of at least one of said switchable logic elements by virtue of having a different switching threshold level relative to said switchable logic elements, said intermediate stage switchable logic elements thereby blocking passage of spurious signals during said clock pulse rise and decay time.

2. A bistable trigger circuit as claimed in claim 1 wherein said intermediate stage logic elements are AND-gates and said additional logic element is an inverter.

3. A bistable trigger circuit as claimed in claim 2 wherein said inverter applies inverted clock pulses to an input of each of the AND-gates forming the said intermediate stage logic elements.

4. A bistable trigger circuit as claimed in claim 3 wherein said trigger circuit includes two complementary outputs and is formed with two circuit legs in parallel between said signal input and said complementary outputs and wherein said intermediate stage logic elements comprise two AND-gates, a respective one of which is included in series connection in each of the two legs immediately prior to said output stage.

5. A bistable trigger circuit as claimed in claim 2 wherein said additional logic element has a lower threshold level than at least a particular one of the said plurality of logic elements such that the said additional logic element responds earlier in time than the said one or more of the plurality of logic elements during the rise time of a clock pulse applied to the clock pulse input and responds later in time during the fall time of the clock pulse.

6. A bistable trigger circuit according to claim 1 wherein said trigger circuit provides two complementary outputs and wherein said switchable logic elements comprises six NOR gates arranged to form a D-type bistable trigger circuit, two of the said NOR gates being cross-coupled to form the output stage and providing said complementary outputs, said intermediate stage logic elements including two AND-gates arranged, in respect of one input of each, respectively in series with an input of each of the cross-coupled NOR gates, and wherein a second input of each of said two AND gates from the output of an inverter forming said additional logic element, the input of which is the said clock pulse input.